INVENTOR:
SAMUEL R. LARGE,
BY Edward H. Goodrich
HIS ATTORNEY.

United States Patent Office 2,741,500
Patented Apr. 10, 1956

2,741,500

ANTIFRICTION BEARING SEAL

Samuel R. Large, Bristol, Conn., assignor to General Motors Corporation, Detroit, Mich., a corporation of Delaware Application October 27, 1950, Serial No. 192,410

1 Claim. (Cl. 286—5)

This invention relates to bearings and particularly to a seal for closing the space between a pair of relatively rotatable antifriction bearing members and which maintains a lubricant within the bearing and also prevents the entrance of water and other deleterious matter into the bearing.

An object of this invention is to provide an improved easily constructed seal of few parts for closing the space between relatively rotatable members as antifriction bearing race rings, to maintain lubricant in the bearing and to exclude foreign matter from the bearing.

A further object is to provide an improved seal in unit-handling relation with a pair of relatively rotatable members such as antifriction bearing race rings and which will maintain an effective sealing relation even under conditions of misalignment.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

Figure 1:
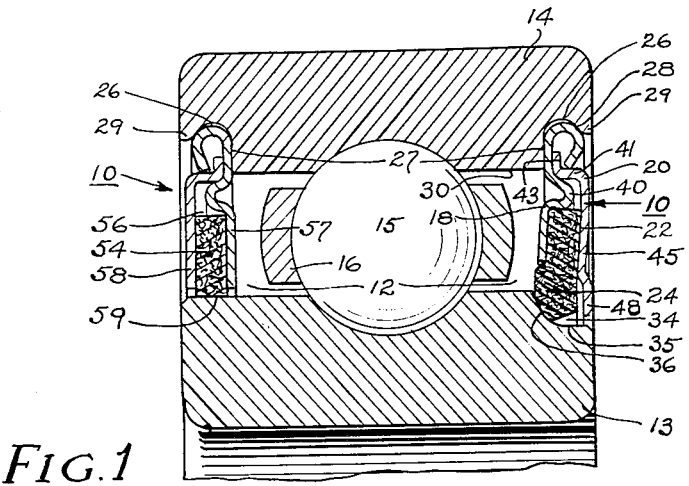
Figure 1 is a cross sectional view of a portion of an antifriction bearing illustrating two related forms of my sealing devices.

Generally considered, my sealing device, as 10, seals an end of an annular lubricant chamber 12 between relatively rotatable members, as antifriction bearing inner and outer race rings 13 and 14 provided with the usual raceways that receive rolling elements, as balls 15, guided by a cage 16. A pair of interfitted annular shields, as 18 and 20, secured to one of the race rings cooperatively provide an annular groove, as 22, in which is mounted a yieldable sealing washer, as 24, that extends into lightly wiping sealing engagement with the other race ring.

In each of the illustrated embodiments, the sealing device 10 is in unit-handling relation with an antifriction bearing. One of the race rings, as the outer race ring 14, has at each end an internally disposed peripherally extending groove 26 provided with a transversely rounded bottom wall merging with an annular shoulder 27 and with a diverging outer wall 28 that terminates in an annular land 29 having a diameter intermediate between that of the bottom of the groove and that of an inner cylindrical wall 30 of this outer race ring 14. The right hand end of the inner race ring 13 as shown in Figures 1, 2 and 3 has an annular notch 34 provided with a generally cylindrical surface 35 and an annular, preferably frusto-conical side face 36, the cylindrical surface and side face blending with an intermediate transversely curved surface of this notch.

Figure 2:
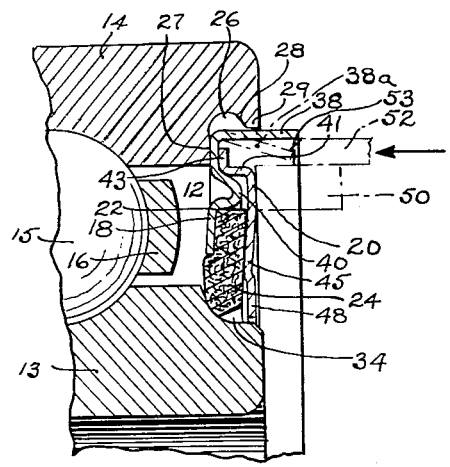
Figure 2 is a fragmentary cross section of a bearing showing the method of assembly of one of the sealing devices with the bearing.
Figure 3:
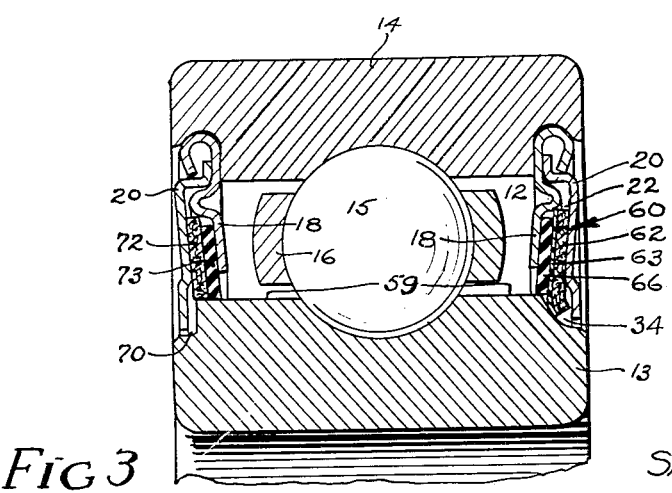
Figure 3 is a cross sectional view of a portion of an antifriction bearing illustrating two other related forms of my sealing device.

In the embodiment at the right hand of Figure 1 and of Figure 2, the inner annular shield 18 which may be stamped out from suitable sheet metal and bent to shape, is initially provided with a laterally extending peripheral flange 38 arranged to fit within the annular land 29 as shown in Figure 2. The substantially flat inner wall of the shield 18 which seats against the shoulder 27 and extends into spaced relation with the inner race ring 13, has intermediate of its width a struck-out projection or rib disposed as an annular bulge 40 laterally extending inwardly from the general plane of the shield towards the outer shield 20 and forming the annular bottom wall of the seal-receiving groove 22. The outer annular shield 20, which may be stamped out from suitable sheet metal and bent to shape, has a cup-shaped peripheral portion 41 piloted on the annular bulge 40 and provided with a radially outwardly extending annular flange 43 seated against the flat inner shield wall between the flange 38 and the bulge 40. A generally radially extending wall 45 of the outer shield extends substantially parallel to the inner shield and into spaced relation with the bottom of the inner shield notch 34.

The inner sealing washer 24, which may be made of felt, cork, synthetic rubber or other suitable lubricant impervious material, is gripped between the shields and extends out of the groove 22 into lightly wiping deformable sealing engagement with the side face 36 of the notch 34. This sealing washer is radially located by its engagement with an annular inner shoulder on the bulge 40, and the inner sealing washer diameter preferably exceeds the bottom diameter of the notch 34 so that in the event of misalignment the sealing washer will remain in sealing engagement with the face 36. The side walls of the shields are preferably bent slightly inwardly towards the bearing to urge the sealing washer into yieldable sealing engagement, and the inner periphery of the outer shield is preferably provided with an annularly extending offset portion 48 to allow for sealing washer deformation at the sealing zone.

During assembly, with the parts in the positions illustrated in Figure 2, the flange 38 is bent slightly radially inwardly as indicated at 38A and a pilot ring 50 is temporarily pressed against the outer shield 20 with this cylindrical pilot ring peripherally forming a continuation of the cylindrical offset of the cupped portion 41. A ram 52, slidably piloted on the ring 50 and having a lip 53 engaging the outer end of the bent-over flange 38, is forced inwardly causing the flange to curl radially outwardly into tightly seated permanent sealing relation in the groove 26 with the outer end of this flange reentrantly bent inwardly and firmly engaging the cupped portion 41 of the outer race ring and holding the outer shield tightly seated against the inner shield. To avoid possible distortion of the race ring which has the groove 26, the lateral width of the flange 38 is such that when curled into position this flange will not bottom in the groove 26 but will tightly wedge against the side walls of the groove thereby firmly securing the seal in unit-handling relation with the bearing.

In the embodiment at the left hand end of Figure 1, a yieldably resilient sealing washer 52, which may be composed of felt, cork, synthetic rubber or other suitable material impervious to lubricant, is located within an annular groove 56 between inner and outer shields 57, 58 generally corresponding to and mounted in the same manner as the shield members 18 and 20. The side walls of these shields extend part way across the lubricant chamber 12 into closely surrounding spaced relation with the race ring 13 and the sealing washer 54 radially projects from this groove into lightly wiping sealing engagement with a cylindrical periphery 59 of the race ring 13.

In the embodiment at the right hand end of Figure 3, the interlocked inner and outer shields 18 and 20 support within the annular sealing washer groove 22 a laminated sealing washer generally indicated at 60 and which sealingly engages the race ring 13 within the annular notch 34 and which also sealingly engages the cylindrical periphery 59 of this race ring. The outer lamina of this sealing washer may be composed of a washer 62 of felt, cork, synthetic rubber or other suitable yieldably resilient material which is impervious to lubricant. The washer 62 is preferably supplied on its inner face with a thin adhering coating 63 of a flexible lubricant-impervious material preferably composed of a polyamide resin that is a reaction product of a dicarboxylic acid and a diamine and commonly referred to as "nylon" and which has a very low coefficient of friction when in relatively rotatable sealing engagement with a lubricated surface on a race ring. The inner portion of the washer 62 laterally deforms to lightly and resiliently position the coating 63 in sealing engagement with the side of notch 34. The bore of this washer 62 preferably exceeds the diameter of the bottom of the notch 34 to allow for effective sealing engagement even in the event of misalignment of the race rings. The inner lamina of the sealing washer 60 may comprise a washer 66 of synthetic rubber or other suitable resiliently yieldable material which will not be deleteriously affected by lubricant. This washer 66 is resiliently compressed between the inner shield and the "nylon" coating and the inner periphery of this washer 66 is in light yieldable sealing contact with the cylindrical race ring surface 59.

In the embodiment at the left of Figure 3, the outer shield member 20 extends into closely spaced relation with the race ring 13 within an annular notch 70. A laminated sealing washer within the annular seal-receiving groove 22 has its inner peripheries in lightly wiping sealing engagement with the cylindrical race ring surface 59. This sealing washer may comprise an outer washer 72 of yieldable lubricant-impervious material as felt, cork or the like and an inherently resilient inner washer 73 of synthetic rubber or a similar material, the inner washer 73 preferably being resiliently compressed between the inner shield 18 and the outer washer 20.

I claim:

In a seal for closing the end of an annular lubricant chamber between a pair of relatively rotatable members one of which has a cylindrical portion terminating in an annular notch, a pair of sheet metal shields extending alongside the lubricant chamber, a flange on the inner shield securing the shields in assembled relation and secured to one of the relatively rotatable members, said shields cooperatively providing a groove opening onto said notch and onto said cylindrical portion, a laterally struck-out annular bulge on the inner shield extending into the outer shield, a cupped portion of the outer shield fitted over said bulge and radially positioned thereby, said bulge forming the bottom wall of said groove, a flange on the outer shield seated against the bulge and located in radially spaced relation to the inner shield flange, a laminated sealing washer laterally gripped by the shields within said groove, the sealing washer including an annular yieldable member and an annular resilient member, the annular resilient member sealingly engaging said cylindrical surface, and an antifriction coating of a polyamide resin bonded to the yieldable member and sealingly engaging a side wall of said notch.

References Cited in the file of this patent

UNITED STATES PATENTS

| | | |
|---|---|---|
| 1,902,620 | Cobb | Mar. 21, 1933 |
| 1,917,988 | Large | July 11, 1933 |
| 2,029,072 | Hughes | Jan. 28, 1936 |
| 2,054,580 | Delaval-Crow | Sept. 15, 1936 |
| 2,074,672 | Rogers | Mar. 23, 1937 |
| 2,140,091 | Murden | Dec. 13, 1938 |
| 2,172,325 | Victor et al. | Sept. 5, 1939 |
| 2,202,770 | Brodin | May 28, 1940 |
| 2,252,554 | Carothers | Aug. 12, 1941 |
| 2,320,794 | Pew | June 1, 1943 |
| 2,655,393 | Cobb | Oct. 13, 1953 |

FOREIGN PATENTS

| | | |
|---|---|---|
| 508,640 | Great Britain | of 1939 |
| 546,260 | Great Britain | of 1942 |

OTHER REFERENCES

"Molded and Machined Nylon," Product Engineering, December 1946.